US007484406B2

(12) United States Patent
Miyahara

(10) Patent No.: US 7,484,406 B2
(45) Date of Patent: Feb. 3, 2009

(54) ABNORMALITY DETERMINING APPARATUS OF FUEL VAPOR PROCESSING SYSTEM

(75) Inventor: Hideki Miyahara, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 113 days.

(21) Appl. No.: 11/717,751

(22) Filed: Mar. 14, 2007

(65) Prior Publication Data

US 2007/0214876 A1 Sep. 20, 2007

(30) Foreign Application Priority Data

Mar. 15, 2006 (JP) ............................ 2006-070864

(51) Int. Cl.
*G01M 15/00* (2006.01)

(52) U.S. Cl. .................................... 73/114.39; 73/49.7

(58) Field of Classification Search ..................... 73/40, 73/46, 47, 49.7, 114.38, 114.39
See application file for complete search history.

(56) References Cited

U.S. PATENT DOCUMENTS 7,137,288 B2 * 11/2006 Kobayashi et al. ........... 73/49.7
7,284,530 B2 * 10/2007 Nagasaki et al. ........ 123/198 D
2007/0199372 A1 * 8/2007 Annoura .................... 73/118.1

FOREIGN PATENT DOCUMENTS

JP A-2004-301027 10/2004

* cited by examiner

*Primary Examiner*—Eric S McCall
(74) *Attorney, Agent, or Firm*—Oliff & Berridge, PLC

(57) ABSTRACT

An abnormality determining apparatus of a fuel vapor processing system is provided. The system includes a canister for temporarily reserves fuel vapor generated within a fuel tank and a fuel vapor path for discharging the fuel vapor to an engine intake passage. When it is determined that there is a leak abnormality in the fuel vapor path, a pump is operated to discharge air from the fuel vapor path to the outside through the canister. When the pump is operated, a detector detects a pressure in the fuel vapor path as an actually measured pressure. A determining section determines whether there is a leak abnormality. The determining section sets a first determination pressure and a second determination pressure that is higher than the first determination pressure. The determining section determines that there is no leak abnormality either when a first condition is met or when a second condition is met. The first condition indicates that the actually measured pressure is less than or equal to the first determination pressure, and the second condition indicates that the actual measured pressure when changes due to the operation of the pump have subsided is less than or equal to the second determination pressure. The determining section determines that there is a leak abnormality when none of the first condition nor the second condition is met.

8 Claims, 11 Drawing Sheets

| | |
|---|---|
| STABILIZATION DETERMINATION PRESSURE Pa | LOW ⟷ HIGH |
| REFERENCE PRESSURE PLv | LOW ⟷ HIGH |

ABNORMALITY DETERMINING APPARATUS OF FUEL VAPOR PROCESSING SYSTEM

BACKGROUND OF THE INVENTION

The present invention relates to an abnormality determining apparatus of a fuel vapor processing system discharging a fuel vapor generated within a fuel tank to an engine intake passage.

As is well known, the fuel vapor processing system introduces a fuel vapor generated within a fuel tank into a canister through a vapor passage, temporarily reserves the fuel vapor by collecting by the canister, and discharges the collected fuel vapor appropriately to an intake passage of an internal combustion engine through a purge passage from the canister.

Further, as disclosed in Japanese Laid-Open Patent Publication No. 2004-301027, there has been well known an abnormality determining apparatus determining whether or not there is generated an abnormality (a leak abnormality) that a gas containing a fuel vapor leaks to the outside due to a perforation or the like in a fuel vapor path constituted by the vapor passage, the canister, the purge passage and the like.

The abnormality determining apparatus is provided with a pump connected to the fuel vapor path mentioned above. Further, at the time of executing the determination of the leak abnormality, an air is discharged to the outside from an inner side of the fuel vapor path in a closed state through an operation of the pump, and a pressure (an actually measured pressure) of the fuel vapor path is compared with a predetermined determination pressure. A pressure of the fuel vapor path at this time is lowered little by little to a predetermined pressure determined by a performance of the pump, a volumetric capacity of the fuel vapor path and the like so as to be stabilized unless the air makes an intrusion into the path from the outside.

On the basis of this point, in the abnormality determining apparatus, in the case that the actually measured pressure becomes equal to or less than the predetermined determination pressure, it is determined that the pressure of the fuel vapor path is sufficiently lowered, and the air does not make an intrusion into the fuel vapor path from the outside, or the air at such a degree that the abnormality determination is necessary does not make an intrusion, thereby determining that the leak abnormality is not generated. On the other hand, in the case that the actually measured pressure does not become equal to or less than the predetermined determination pressure, it is determined that the pressure of the fuel vapor path is not sufficiently lowered, and the air makes an intrusion into the fuel vapor path from the outside, thereby determining that the leak abnormality is generated.

In this case, the abnormality determining apparatus mentioned above is structured such that the air passing through the canister, in other words, the purified air that the fuel vapor is collected through the operation of the pump, is discharged to the outside from the fuel vapor path.

In this case, as the canister mentioned above, a canister is employed that has a structure in which the fuel is collected by adsorbing the fuel vapor (a vapor-phase fuel) while condensing to a liquid-phase fuel. Accordingly, at a time when the fuel is collected to the canister, the pressure within the canister and thus the pressure of the fuel vapor path are suddenly lowered in correspondence to the sudden reduction in the volume of the fuel due to condensation of the fuel.

Accordingly, in the abnormality determining apparatus mentioned above, if the determination of the leak abnormality is executed under a condition that a lot of fuel vapor exists within the fuel tank, the fuel vapor is introduced to the canister from the fuel tank through the operation of the pump, and the pressure of the fuel vapor path is suddenly lowered. Further, if a residual volume of the fuel vapor within the fuel tank becomes small thereafter, and the amount of the fuel vapor introduced into the canister becomes small to some extent, a pressure decrease amount caused by the condensation of the fuel becomes small, and a pressure decrease speed of the fuel vapor path becomes lower.

At this time, in the case that the leak abnormality does not exist in the fuel vapor path, the air within the fuel vapor path is discharged to the outside through the operation of the pump and the pressure of the fuel vapor path keeps lowering. Therefore, the pressure subsides to the predetermined pressure mentioned above.

In contrast, in the case that the leak abnormality exists in the fuel vapor path, the pressure of the fuel vapor path shifts to an ascent by a pressure increase amount caused by an intrusion of the air into the fuel vapor path. Accordingly, the change of the pressure thereafter subsides to a higher pressure than the predetermined pressure. As mentioned above, in the abnormality determining apparatus, in the case that the determination of the leak abnormality is executed under the condition that the pressure of the fuel vapor path is unlikely to be lowered due to the existence of the leak abnormality, the pressure of the fuel vapor path can become lower due to the condensation of the fuel within the canister only temporarily.

Further, if the temporary decrease of the pressure of the fuel vapor path is generated and the actually measured pressure becomes equal to or less than the predetermined determination pressure, it is erroneously determined that the leak abnormality is not generated in the fuel vapor path. As mentioned above, in the abnormality determining apparatus mentioned above, the temporary decrease of the pressure of the fuel vapor path mentioned above contributes to the reduction of a determination precision about the determination of the leak abnormality.

SUMMARY OF THE INVENTION

An objective of the present invention is to provide an abnormality determining apparatus of a fuel vapor processing system which can precisely determine whether or not a leak abnormality of a fuel vapor path is generated.

In order to achieve the objective mentioned above, in accordance with an aspect of the present invention, an abnormality determining apparatus of a fuel vapor processing system is provided. The system includes a canister for temporarily reserves fuel vapor generated within a fuel tank and a fuel vapor path for discharging the fuel vapor to an engine intake passage. The abnormality determining apparatus includes a pump, a detector, and a determining section. When it is determined that there is a leak abnormality in the fuel vapor path, the pump is operated to discharge air from the fuel vapor path to the outside through the canister. When the pump is operated, the detector detects a pressure in the fuel vapor path as an actually measured pressure. The determining section determines whether there is a leak abnormality. The determining section sets a first determination pressure and a second determination pressure that is higher than the first determination pressure. The determining section determines that there is no leak abnormality either when a first condition is met or when a second condition is met. The first condition indicates that the actually measured pressure is less than or equal to the first determination pressure. The second condition indicates that the actual measured pressure when changes due to the operation of the pump have subsided is less than or equal to the second determination pressure. The determining section determines that there is a leak abnormality when none of the first condition nor the second condition is met.

In accordance with another aspect of the present invention, an abnormality determining apparatus of a fuel vapor processing system is provided. The system includes a canister for temporarily reserves fuel vapor generated within a fuel tank and a fuel vapor path for discharging the fuel vapor to an engine intake passage. The abnormality determining apparatus includes a pump, a detector, a determining section, and an inhibiting section. When it is determined that there is a Leak abnormality in the fuel vapor path, the pump is operated to discharge air from the fuel vapor path to the outside through the canister. When the pump is operated, the detector detects a pressure in the fuel vapor path as an actually measured pressure. The determining section detects whether there is a leak abnormality. The determining section determines that there is no leak abnormality when the measured pressure falls to or below a predetermined pressure. The inhibiting section inhibits the execution of the leak abnormality determination for a predetermined period after the operation of the pump is started.

DETAILED DESCRIPTION OF THE PREFERRED EMBODIMENTS

A description will be given below of a first embodiment which embodies an abnormality determining apparatus of a fuel vapor processing system 10 in accordance with the present invention.

Figure 1:
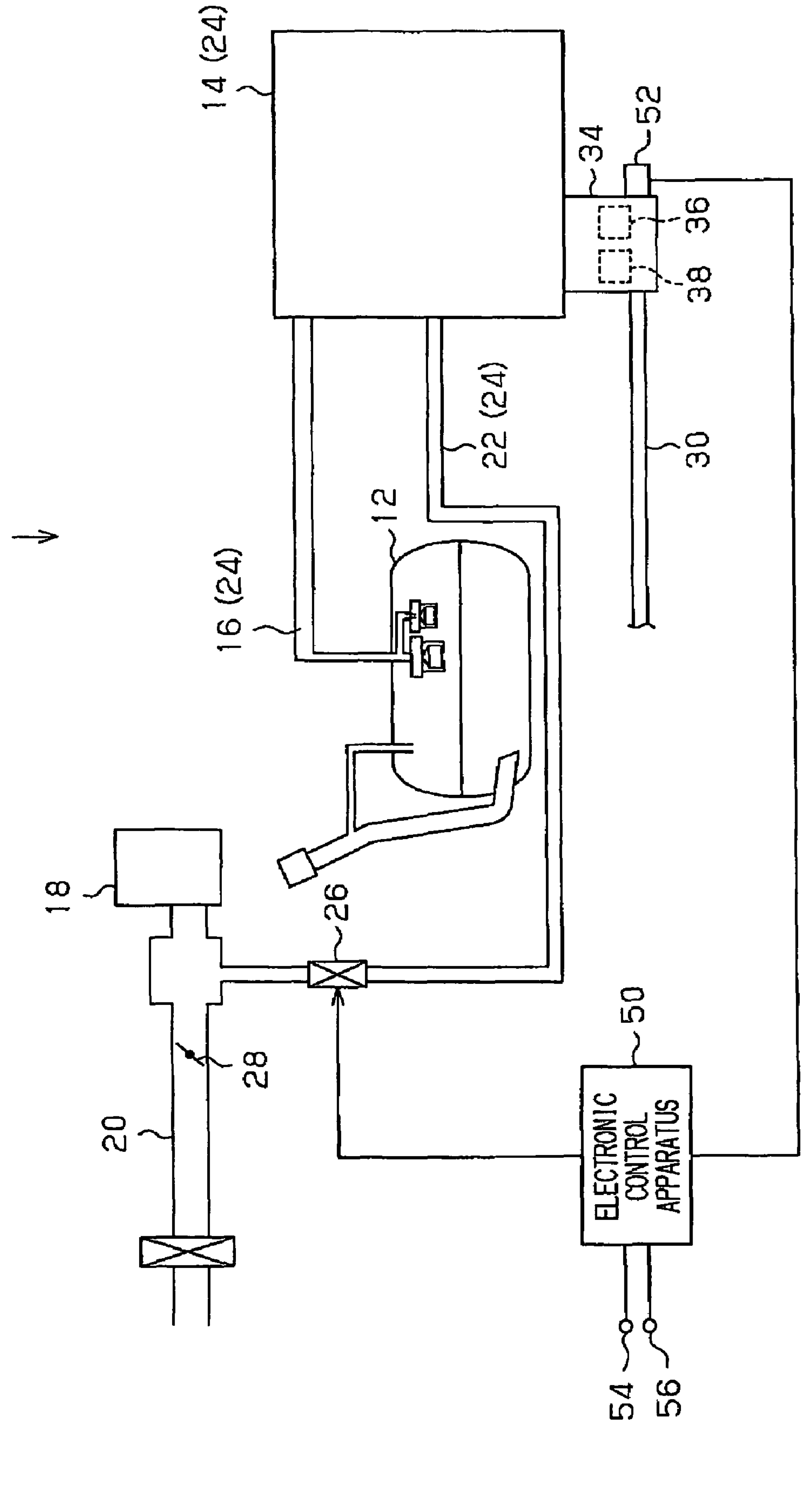
FIG. 1 is a schematic view showing a structure of a fuel vapor processing system according to a first embodiment of the present invention.

FIG. 1 shows a schematic structure of the fuel vapor processing system 10 to which the abnormality determining apparatus in accordance with the present embodiment is applied.

As shown in FIG. 1, a fuel vapor processing system 10 is provided with a canister 14 adsorbing a fuel vapor generated within a fuel tank 12, a vapor passage 16 connecting the fuel tank 12 and the canister 14, and a purge passage 22 connecting an intake passage 20 of an internal combustion engine 18 and the canister 14. In the present embodiment, a continuous path constituted by the canister 14, the vapor passage 16 and the purge passage 22 is referred to as a fuel vapor path 24.

A fuel vapor generated within the fuel tank 12 is fed to the canister 14 through the vapor passage 16. The canister 14 is provided with an adsorbent in an inner portion thereof, and temporarily stores the fuel vapor (a vapor-phase fuel) from the fuel tank 12 by adsorbing the fuel vapor to the adsorbent while condensing the fuel vapor to a liquid-phase fuel. The canister 14 is structured such as to freely break away the fuel adsorbed to the adsorbent again.

A purge control valve 26 constituted by an electromagnetic valve is provided in the purge passage 22 connecting the canister 14 and the intake passage 20. The purge control valve 26 is normally closed. The purge control valve 26 is opened, whereby a pressure (an intake negative pressure) of the intake passage 20 of the internal combustion engine 18 is introduced to the canister 14 via the purge passage 22. A throttle valve 28 for regulating an intake air amount is provided in the intake passage 20.

On the other hand, an atmospheric air introduction passage 30 for introducing an atmospheric air into an inner portion of the canister 14 is connected to the canister 14. Further, a pump module 34 is provided in a connection portion of the atmospheric air introduction passage 30 to the canister 14.

A description will be specifically given below of the pump module 34.

Figure 2:
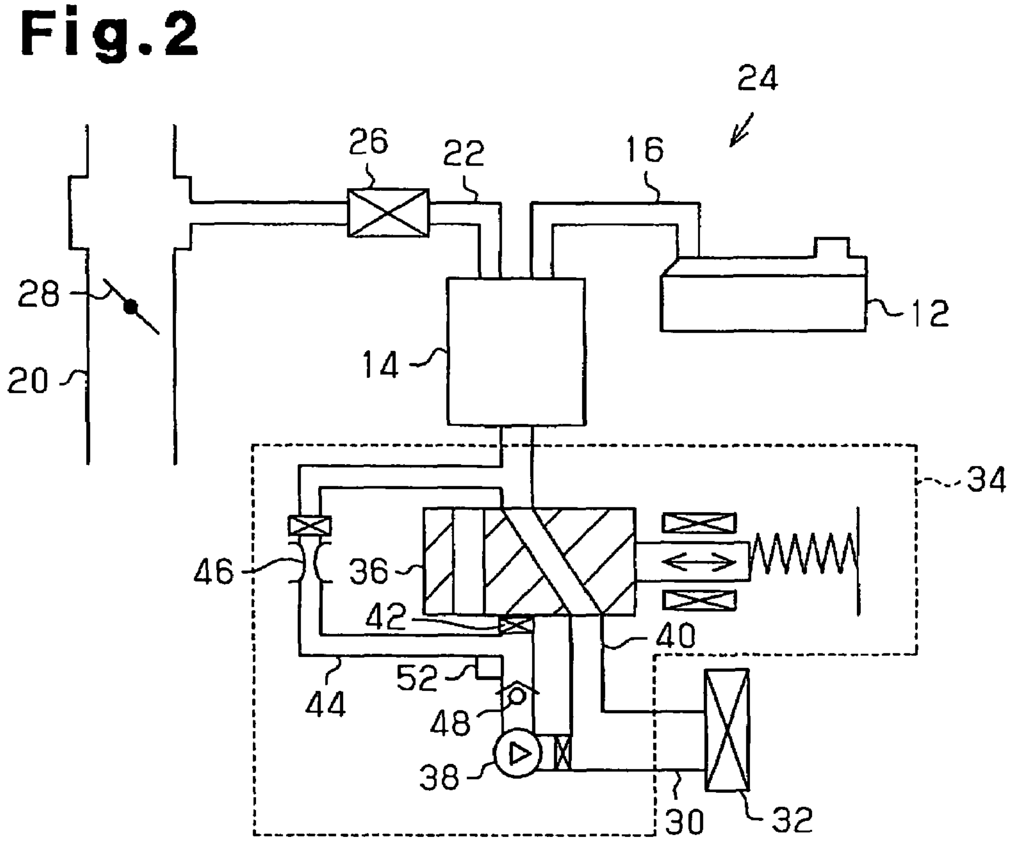
FIG. 2 is a schematic view showing a structure of a pump module in accordance with the first embodiment.
Figure 3:
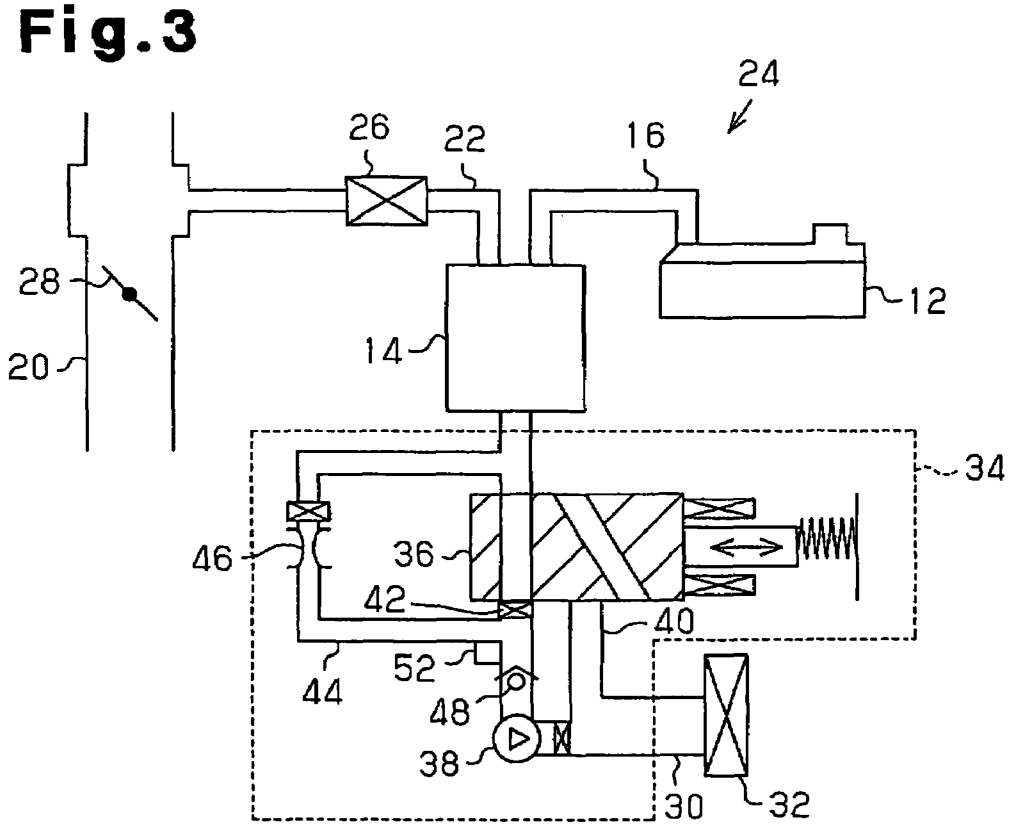
FIG. 3 is a schematic view showing the structure of the pump module.

As shown in FIGS. 2 and 3, the pump module 34 is roughly constituted by three paths connecting the canister 14 and the atmospheric air introduction passage 30, a switch valve 36 switching a connection mode between the canister 14 and the atmospheric air introduction passage 30 through the paths, a pressure sensor 52 functioning as a detector for detecting a pressure of the paths, and an electric pump 38.

In these three paths, a main path 40 corresponds to a path for directly connecting the canister 14 and the atmospheric air introduction passage 30, and a determination path 42 corresponds to a path connecting the canister 14 and the atmospheric air introduction passage 30 via a pump 38. Further, a reference path 44 in the three paths corresponds to a path connecting the canister 14 and the atmospheric air introduction passage 30 via the pump 38, in the same manner as the determination path 42. A throttle 46 is provided in the reference path 44.

The pump 38 mentioned above forcibly discharges the air within the fuel vapor path 24, the determination path 42, and the reference path 44 to an outside. An intake side of the pump 38 is provided with a check valve 48 which is opened at a time when the pressure in the intake side is lowered by the operation of the pump 38, and the pressure sensor 52.

Further, the canister 14 and the atmospheric air introduction passage 30 are connected via the main path 40 at a time when the switch valve 36 is under an "OFF position" (refer to FIG. 2), and are connected via the determination path 42 at a time when the switch valve 36 is under an "ON position" (refer to FIG. 3). On the other hand, the canister 14 and the atmospheric air introduction passage 30 are always connected via the reference path 44.

An inner diameter of the throttle 46 is set to achieve such a pressure as to determine that there is generated an abnormality (a leak abnormality) that a gas including the fuel vapor within the fuel vapor path 24 leaks to the outside in the case that a pressure (an actually measured pressure P) detected by the pressure sensor 52 is stabilized at a higher pressure, at a time when the pump 38 is driven in a state in which the switch valve 36 is at the "OFF position".

An electronic controller 50 (refer to FIG. 1) functioning as a determining section is mainly constituted by a digital computer provided with a CPU, a ROM, a RAM and the like, and a drive circuit for driving various apparatuses. The electronic controller 50 receives output signals of various sensors, executes various computations, and controls the operation of the purge control valve 26, the switch valve 36 and the pump 38 on the basis of the results of the computations.

As the various sensors mentioned above, a temperature sensor 54 for detecting a temperature of the fuel within the fuel tank 12, a remaining amount sensor 56 for detecting an amount of the fuel (a fuel remaining amount) existing within the fuel tank 12, and the like are disposed to the fuel vapor processing system 10 in addition to the pressure sensor 52 mentioned above.

Further, the apparatus in accordance with the present embodiment is provided with a main switch (not shown) for supplying an electric power to the switch valve 36, the pump 38 and the pressure sensor 52 after the operation of the internal combustion engine 18 is stopped, a main relay (not shown) for supplying the electric power to the electronic controller 50 and the like.

The fuel vapor processing system 10 functions as follows.

First, the fuel vapor generated within the fuel tank 12 is fed to the canister 14 through the vapor passage 16, and is adsorbed to the adsorbent of the canister 14. When the purge control valve 26 is opened at an appropriate timing, the intake negative pressure is supplied to the canister 14 via the purge passage 22 at this time, and the atmospheric pressure is introduced to the canister 14 via the atmospheric air introduction passage 30. Accordingly, the fuel adsorbed to the adsorbent of the canister 14 breaks away as the fuel vapor and is discharged to the intake passage 20.

Further, in the fuel vapor processing system 10, the determination whether or not the leak abnormality of the fuel vapor path 24 is generated is executed, after the stop state of the internal combustion engine 18 is continued for a predetermined time (for example, five hours). In this abnormality determination, an abnormality determination for detecting a small amount of leak from the fuel vapor path 24, and an abnormality determination for detecting a comparatively large amount of leak are executed.

First, a description will be given of an outline of the process (the small amount of leak determining process) of the abnormality determination for detecting the small amount of leak with reference to a timing chart shown in FIG. 4.

Figure 4:
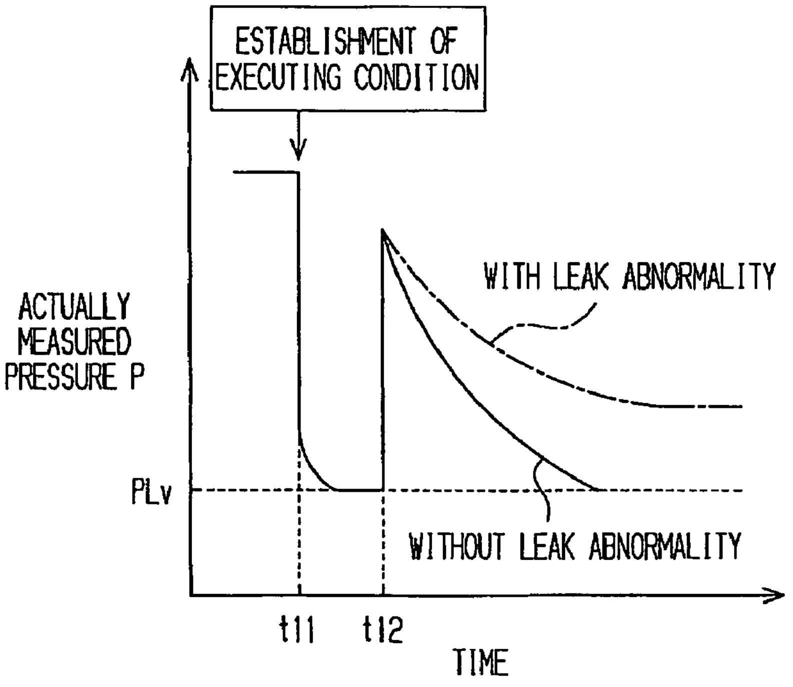
FIG. 4 is a timing chart showing one example of a processing of a small amount leak determining process in accordance with the first embodiment.

As shown in FIG. 4, in this process, first, the pump 38 is driven for a certain period (time t11 to time t12) in a state in which the switch valve 36 is at the OFF position as well as the purge control valve 26 is closed, in other words, in a state in which the pump 38 is connected to the reference path 44 (a reference state: a state shown in FIG. 2). Accordingly, the air within the reference path 44 is discharged by the pump 38, and the pressure of the reference path 44 is lowered little by little. Further, the pressure (specifically, the actually measured pressure P mentioned above) of the reference path 44 in which the change subsides during the operation is stored as a reference pressure PLv for determining the leak abnormality of the fuel vapor path 24 (time t12).

Thereafter (after the time t12), the pump 38 is driven in a state in which the switch valve 36 is at the ON position, in other words, in a state in which the pump 38 is connected to the fuel vapor path 24 (an actual measurement state: a state shown in FIG. 3). Accordingly, the air within the fuel vapor path 24 is discharged to the atmospheric air by the pump 38, and the actually measured pressure P is lowered. In this case, as shown by a solid line in FIG. 4, in the case that the leak abnormality is not generated in the fuel vapor path 24, the actually measured pressure P is quickly lowered. On the other hand, as shown by a one-dot chain line in FIG. 4, in the case that the leak abnormality is generated, the amount of decrease of the pressure of the fuel vapor path 24 is reduced by a degree corresponding to the amount of the air making an intrusion into the fuel vapor path 24, and the actually measured pressure P is stabilized at a comparatively high pressure after being changed. In this small amount of leak determining process, since the pressure (the actually measured pressure P mentioned above) of the fuel vapor path 24 is stabilized at the higher pressure than the reference pressure PLv after being changed, a generation of such a phenomenon is suppressed, and it is determined that the leak abnormality is generated in the fuel vapor path 24.

Next, a description will be given of an outline of a process (a large amount of leak determining process) of the abnormality determination for detecting a comparatively large amount of leak with reference to a timing chart shown in FIG. 5.

In this process, in the same manner as the small amount of leak determining process mentioned above, whether or not the leak abnormality is generated is determined on the basis of a comparison between the actually measured pressure P and the predetermined determination pressure. In this process, a value corresponding to a higher pressure than the reference pressure PLv is calculated on the basis of the reference pressure PLv, and is set as the predetermined determination pressure Pa used for determining the leak abnormality. The determination pressure Pa is determined, for example, on the basis of the following expression.

Determination pressure Pa=reference pressure PLv (pressure based on atmospheric pressure)×0.2

Figure 5:
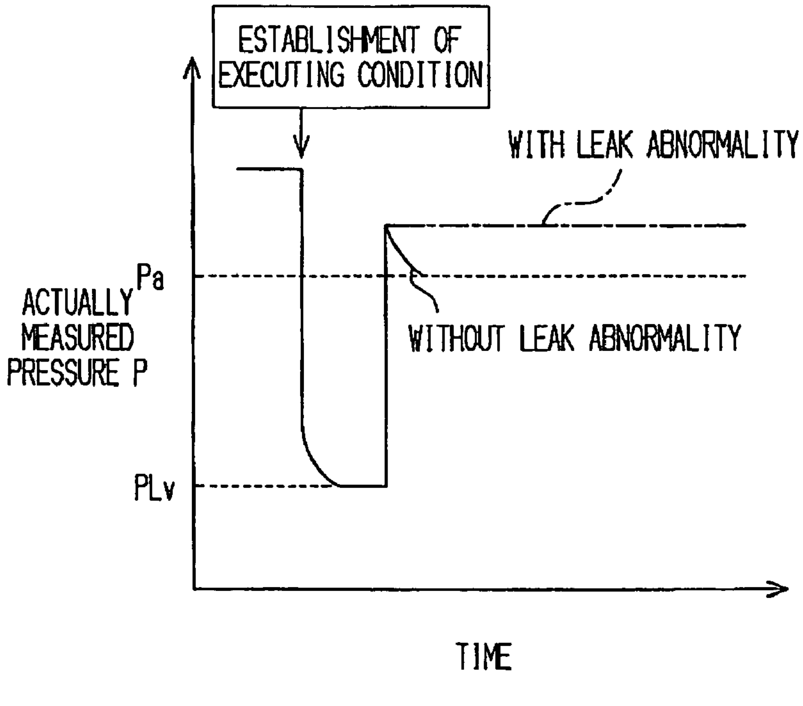
FIG. 5 is a timing chart showing one example of a relationship between a predetermined determination pressure and an actually measured pressure.

As shown by a one-dot chain line in FIG. 5, in the case that the large amount of leak is generated in the fuel vapor path 24, the pressure of the fuel vapor path 24 is hardly lowered even if the pump 38 is driven in the actual measurement state. Accordingly, it is possible to precisely determine that the large amount of leak is not generated, on the basis of the fact that the actually measured pressure P reaches the predetermined determination pressure Pa higher than the reference pressure PLv, as shown by a solid line in FIG. 5. In the present process, the predetermined determination pressure Pa mentioned above is set for the reason mentioned above.

In this case, as mentioned above, in the case that the determination of the leak abnormality is executed under a condition that the pressure of the fuel vapor path 24 is unlikely to be lowered due to the existence of the leak abnormality, there is a case that the pressure of the fuel vapor path 24 becomes lower due to the condensation of the fuel within the canister 14 only temporarily.

Figure 6:
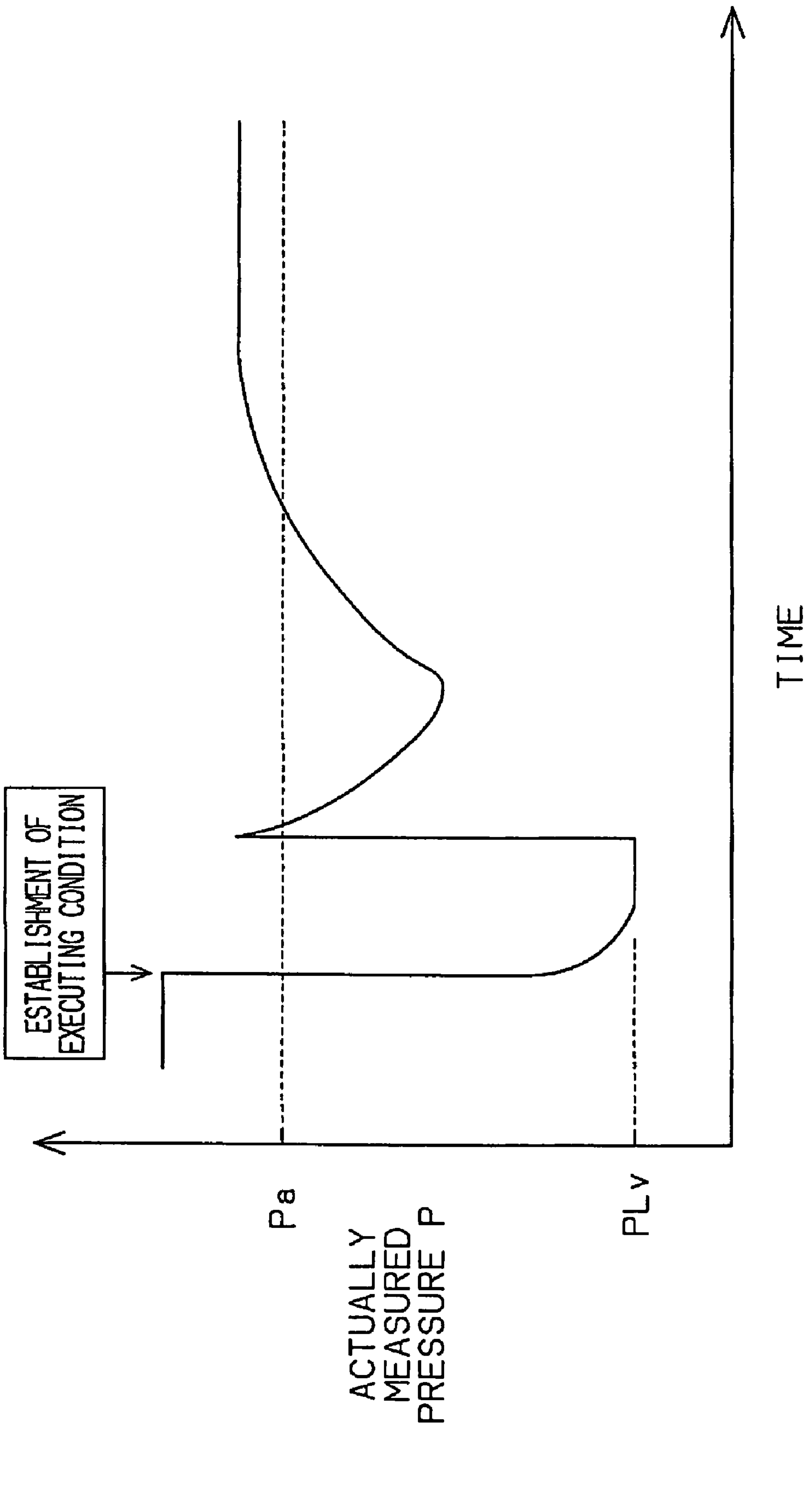
FIG. 6 is a timing chart showing one example of changes of the actually measured pressure in the case that a temporary decrease of a pressure of a fuel vapor path is generated.

FIG. 6 shows an example of changes of the actually measured pressure P in the case that the temporary decrease of the pressure of the fuel vapor path 24 mentioned above is generated at a time when the large amount of leak determination is executed under a condition that a large amount of leak is generated in the fuel vapor path 24, in the apparatus in accordance with the present embodiment. As shown in FIG. 6, in the case that the temporary decrease of the pressure of the fuel vapor path 24 mentioned above is generated, there is a case that the actually measured pressure P becomes equal to or less than the predetermined determination pressure Pa. At this time, it is erroneously determined that the leak abnormality is not generated in the fuel vapor path 24.

On the basis of this point, in the large amount of leak determination in accordance with the present embodiment, a determination pressure Pb lower than the determination pressure Pa is set as the determination pressure used for determining the leak abnormality, in addition to the predetermined determination pressure Pa mentioned above. Further, the determination pressure Pb (hereinafter, refer to as an instantaneous determination pressure Pb) is compared with the actually measured pressure P of the time, and the determination pressure Pa (hereinafter, refer to as a stabilization determination pressure Pa) is compared with the actually measured pressure P at a stabilized state after change. In the present embodiment, the instantaneous determination pressure Pb functions as a first determination pressure, and the stabilization determination pressure Pa functions as a second determination pressure.

As a condition for determining whether or not the leak abnormality is generated, in the large amount of leak determination, a condition I (first condition) on the basis of the instantaneous determination pressure Pb and a condition II (second condition) on the basis of the stabilization determination pressure Pa are set, as described below.

Condition I: the actually measured pressure P is equal to or less than the instantaneous determination pressure Pb.

Condition II: the actually measured pressure P at a stabilized state after being changed by the operation of the pump 38 is equal to or less than the stabilization determination pressure Pa.

Further, in the case that any one of the condition I and the condition II is satisfied, it is determined that the leak abnormality is not generated, and in the case that neither the condition I nor the condition II is satisfied, it is determined that the leak abnormality is generated.

A description will be in detail given below of the large amount of leak determining process mentioned above with reference to a flowchart shown in FIG. 7.

A series of processes shown in this flowchart conceptually show the specific processing procedure of the large amount of leak determining process, and the actual process is executed as the process per a predetermined cycle by the electronic controller 50.

Figure 7:
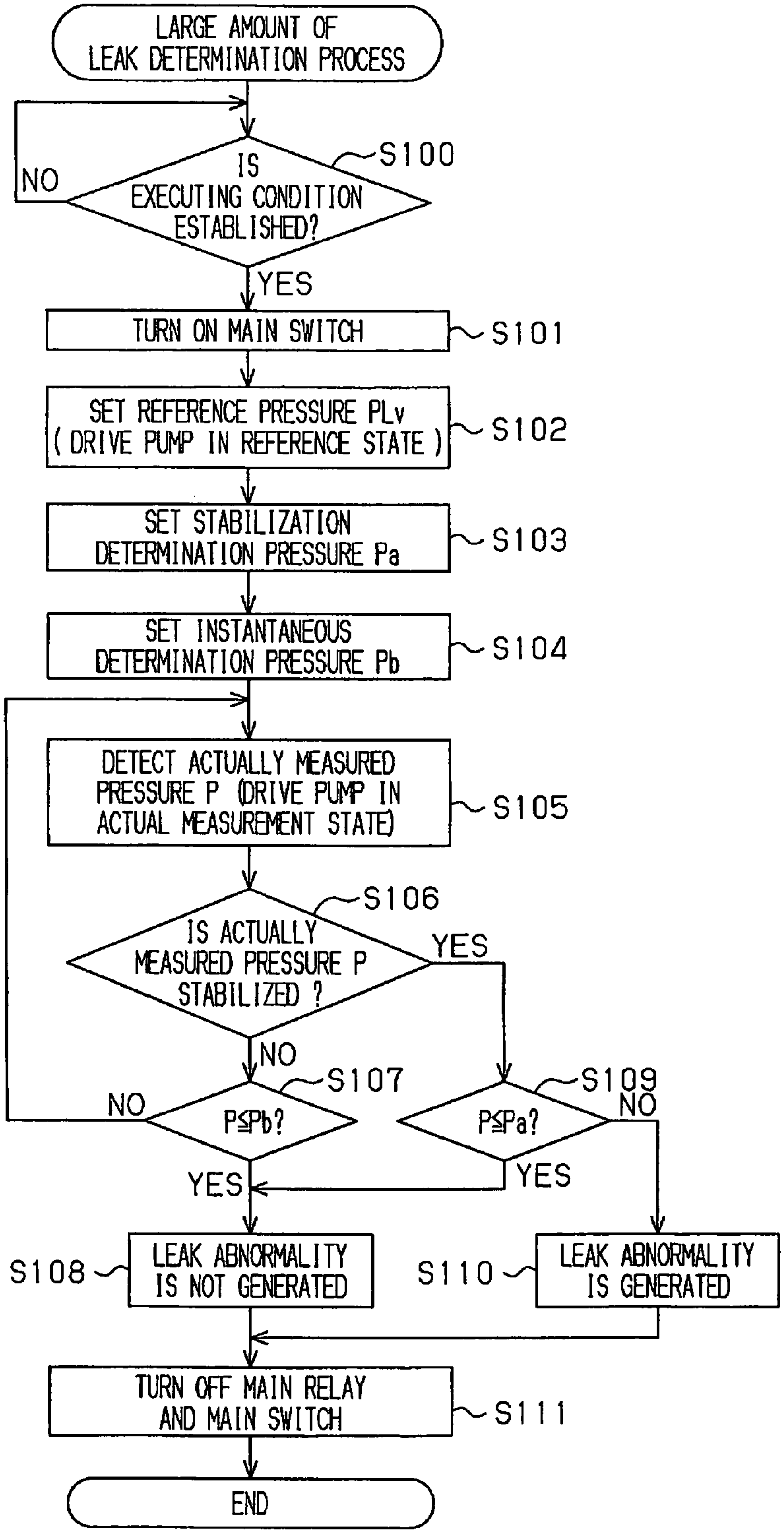
FIG. 7 is a flowchart showing a specific processing procedure of a large amount leak determining process in accordance with the first embodiment.

As shown in FIG. 7, in this process, first, it is determined whether or not the executing condition of the large amount of leak determining process is established (a step S100). In this case, when the operation stop state of the internal combustion engine 18 is continued over a predetermined time or more, it is determined that the executing condition is established. Further, if the executing condition is established (YES in the step S100), the main switch is at the ON position, and an electric power supply for driving the switch valve 36 and the pump 38 is started (a step S101).

Next, as mentioned above, the reference pressure PLv is set (a step S102). Specifically, the pump 38 is driven in the reference state, and the actually measured pressure P at a stabilized state during the operation is stored and set as the reference pressure PLv.

Next, the stabilization determination pressure Pa is set on the basis of the reference pressure PLv (a step S103). In this case, the stabilization determination pressure Pa is set to a such value that the actually measured pressure P at a time when the pressure of the fuel vapor path 24 is stabilized equal to or less than the stabilization determination pressure Pa in the case that the leak is not generated in the fuel vapor path 24 or some amount of leak is generated in the fuel vapor path 24, and that the actually measured pressure P becomes higher than the stabilization determination pressure Pa in the case that a large amount of leak is generated in the fuel vapor path 24. Specifically, as shown in FIG. 8 showing a relationship between the reference pressure PLv and the stabilization determination pressure Pa, the higher the reference pressure PLv is, the higher pressure is set as the stabilization determination pressure Pa.

Next, the instantaneous determination pressure Pb is set on the basis of temperature of the fuel within the fuel tank 12 and the remaining amount of the fuel within the fuel tank 12 (a step S104 in FIG. 7).

Figures 8, 9:
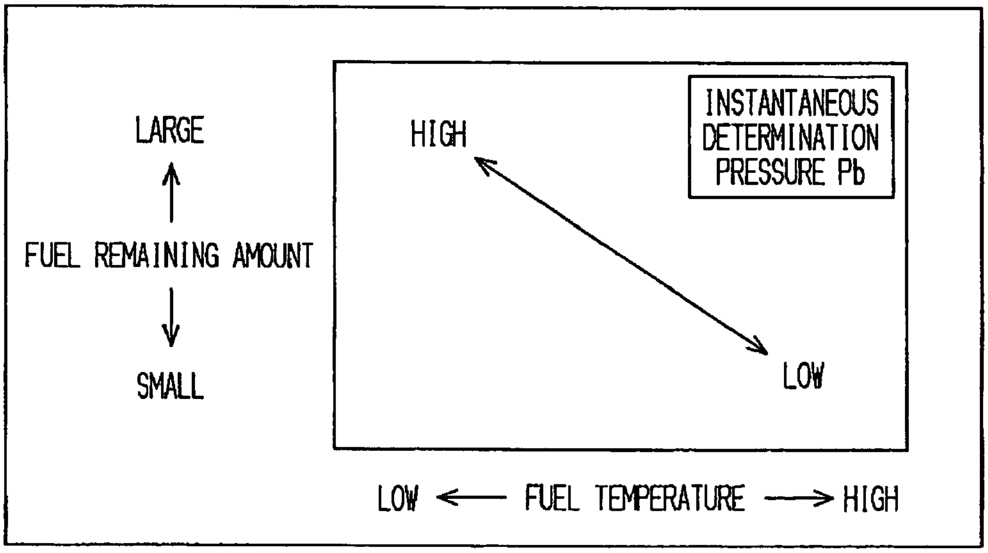
FIG. 8 is a view showing a relationship between a reference pressure and a stabilization determination pressure.
FIG. 9 is a view showing a relationship among a temperature of a fuel within a fuel tank, a remaining amount of the fuel, and an instantaneous determination pressure.

FIG. 9 shows a relationship among the temperature of the fuel within the fuel tank 12, the remaining amount of the fuel, and the instantaneous determination pressure Pb. As shown in FIG. 9, in this case, the higher the fuel temperature, or the smaller the remaining amount of the fuel, the lower the instantaneous determination pressure Pb is set. In this case, the instantaneous determination pressure Pb is set to such a low pressure that the actually measured pressure P does not reach even if the pressure of the fuel vapor path 24 is temporarily lowered under a condition that the large amount of leak is generated in the fuel vapor path 24 as mentioned above.

Thereafter, the pump 38 is driven in the actual measurement state and the actually measured pressure P is detected (a step S105 in FIG. 7), and it is determined whether or not the actually measured pressure P is stabilized (a step S106). In this case, the stabilization of the change of the actually measured pressure P can be determined on the basis of the fact that the condition that the change amount per unit time of the actually measured pressure P is very small is continued over a predetermined period. Further, in the case that the actually measured pressure P is not stabilized (NO in the step S106), it is determined whether or not the actually measured pressure P is equal to or less than the instantaneous determination pressure Pb (a step S107).

Further, if the present process is continuously executed, and the actually measured pressure P becomes equal to or less than the instantaneous determination pressure Pb (YES in the step S107), it is determined that the leak abnormality is not generated (a step S108). In this case, the determination result "the leak abnormality is not generated" in the present process does not correspond to the determination result indicating that no leak of the fuel vapor from the fuel vapor path 24 is generated at all, but corresponds to the determination result indicating that the leak is not generated at such a degree that it is necessary to determine that the large amount of leak is generated in the fuel vapor path 24.

On the other hand, in the case that the actually measured pressure P does not become equal to or less than the instantaneous determination pressure Pb (NO in the step S107), and the actually measured pressure P is stabilized (YES in the step S106), it is determined whether or not the actually measured pressure P is equal to or less than the stabilization determination pressure Pa (a step S109). Further, in the case that the actually measured pressure P at a stabilized state is equal to or less than the stabilization determination pressure Pa (YES in the step S109), it is determined that the leak abnormality is not generated (the step S108).

On the other hand, in the case that the actually measured pressure P at a stabilized state is higher than the stabilization determination pressure Pa (NO in the step S109), it is determined that the leak abnormality is generated (a step S110).

After the determination whether or not the leak abnormality is generated as mentioned above (the step S108 or the step S110), the electric power supply is stopped on the basis of the OFF position of the main relay and the main switch (a step S111), and the present process is finished.

A description will be given below of an effect caused by executing the large amount of leak determining process mentioned above.

Figure 10:
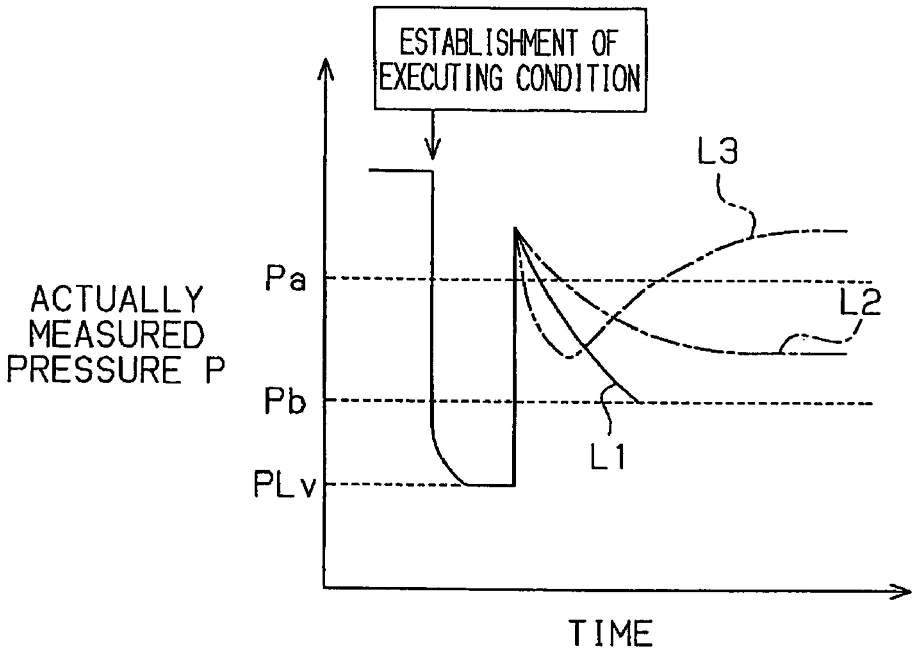
FIG. 10 is a timing chart showing a relationship between a result of determination in the large amount leak determination and changes of the actually measured pressure.

FIG. 10 shows a relationship between the determination result and the changes of the actually measured pressure P in the large amount of leak determination. In this case, in FIG. 10, line L1 shows one example of the relationship mentioned above in the case that the leak is not generated in the fuel vapor path 24, line L2 shows one example of the relationship mentioned above in the case that some amount of leak is generated in the fuel vapor path 24, and line L3 shows one example of the relationship mentioned above in the case that the temporary decrease of the pressure of the fuel vapor path 24 is generated under the condition that the large amount of leak is generated in the fuel vapor path 24.

As mentioned above, in the present embodiment, the instantaneous determination pressure Pb is set to such a low pressure that the actually measured pressure P does not reach even in the case that the pressure of the fuel vapor path 24 is instantaneously lowered under a condition that the large amount of leak is generated in the fuel vapor path 24.

Accordingly, as shown by line L3 in FIG. 10, in the case that the temporary decrease of the pressure of the fuel vapor path 24 is generated under the condition that the large amount of leak is generated in the fuel vapor path 24, there is a case that the actually measured pressure P of the time is temporarily below the stabilization determination pressure Pa, however, the actually measured pressure P does not become equal to or less than the instantaneous determination pressure Pb. Accordingly, the leak abnormality at this time is not erroneously determined.

On the other hand, as shown by line L1 in FIG. 10, in the case that the leak abnormality is not generated in the fuel vapor path 24, the actually measured pressure P is quickly lowered to the instantaneous determination pressure Pb, and the condition I mentioned above is satisfied (YES in the step S107 in FIG. 7), so that it is determined that the leak abnormality is not generated.

Further, in the present embodiment, the stabilization determination pressure Pa is set to such a pressure that the actually measured pressure P at a time when the pressure of the fuel vapor path 24 is stabilized becomes equal to or less than the stabilization determination pressure Pa in the case that some amount of leak is generated in the fuel vapor path 24, and becomes higher than the stabilization determination pressure Pa in the case that the large amount of leak is generated in the fuel vapor path 24.

Accordingly, as shown by line L2 in FIG. 10, even in the case that the actually measured pressure P does not become equal to or less than the instantaneous determination pressure Pb due to some amount of leak in the fuel vapor path 24, the actually measured pressure P at a stabilized state becomes equal to or less than the stabilization determination pressure Pa, the condition II mentioned above is satisfied (YES in the step S109 in FIG. 7), and it is determined that the leak abnormality is not generated.

On the other hand, as shown by line L3 in FIG. 10, in the case that the temporary decrease of the pressure of the fuel vapor path 24 is generated under the condition that the large amount of leak is generated in the fuel vapor path 24, the actually measured pressure P at a stabilized state comes to the higher pressure than the stabilization determination pressure Pa. Accordingly, the condition II mentioned above is not satisfied (NO in the step S109 in FIG. 7). Further, since the condition I mentioned above is not satisfied at this time (NO in the step S107), it is determined that the leak abnormality is generated.

As mentioned above, in accordance with the large amount of leak determination on the basis of the present embodiment, it is possible to determine whether or not the leak abnormality is generated, using the suitable determination pressure (the stabilization determination pressure Pa or the instantaneous determination pressure Pb) in each of the case that the pressure of the fuel vapor path 24 is temporarily lowered due to the condensation of the fuel within the canister 14, and the pressure is stabilized after being changed. Accordingly, it is possible to precisely determine whether or not the leak abnormality is generated in the apparatus in which the temporary decrease of the pressure of the fuel vapor path 24 may be caused.

Figure 11:
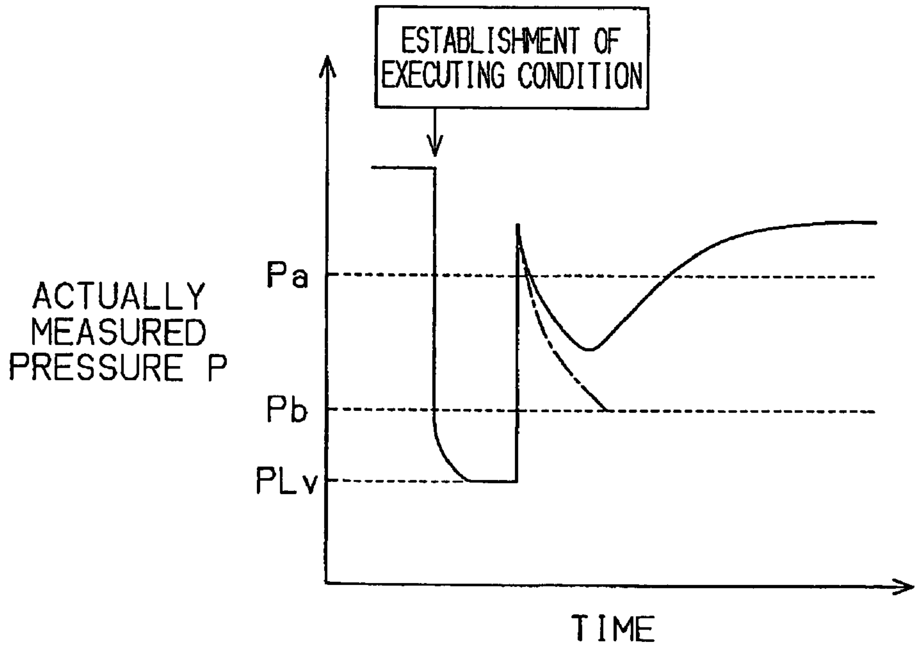
FIG. 11 is a timing chart showing one example of a relationship between a manner for setting each of the determination pressures in the large amount leak determination and the changes of the actually measured pressure.
Figure 12:
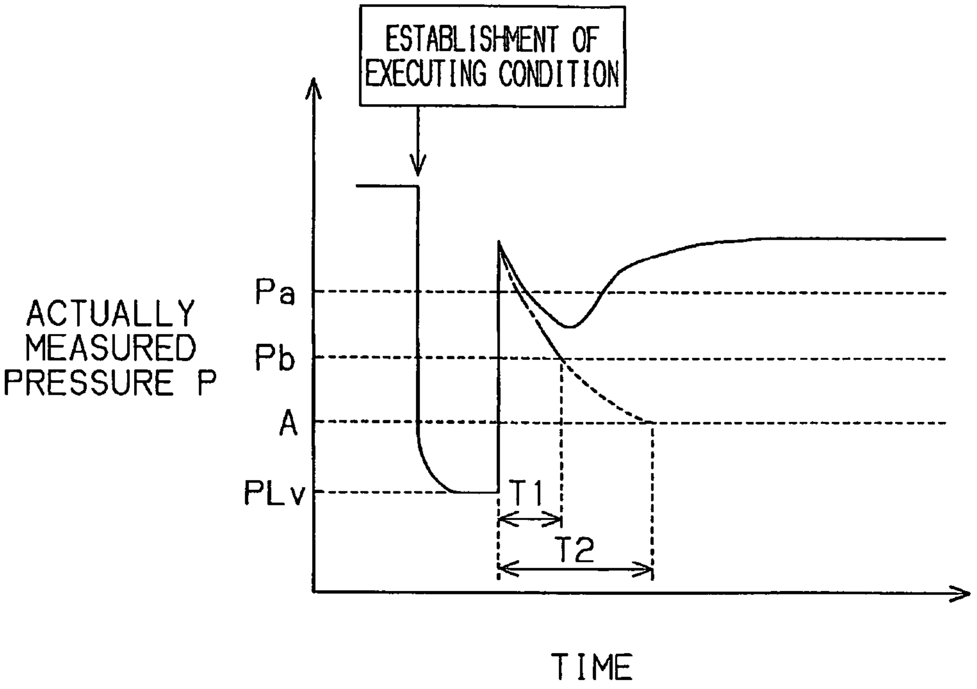
FIG. 12 is a timing chart showing another example of the relationship between a manner for setting each of the determination pressures in the large amount leak determination and changes of the actually measured pressure.

FIGS. 11 and 12 show a relationship between the manner for setting each of the determination pressures Pa and Pb in the large amount of leak determination and the changes of the actually measured pressure P.

FIG. 11 shows one example of the relationship mentioned above in the case that a concentration of the fuel vapor within the fuel tank 12 is high or the remaining amount of the fuel within the fuel tank 12 is small at the time of starting the operation of the pump 38 in the actual measurement state. FIG. 12 shows one example of the relationship mentioned above in the case that the concentration of the fuel vapor mentioned above is low or the remaining amount of the fuel is large.

As shown in FIGS. 11 and 12, the higher the concentration of the fuel vapor within the fuel tank 12 at the time of starting the operation of the pump 38 in the actual measurement state (a start time concentration) is, the more a total amount of the fuel vapor introduced into the canister 14 at the time of executing the large amount of leak determination. Accordingly, the pressure of the fuel vapor path 24 is largely lowered by the condensation. Further, the smaller the remaining amount of the fuel within the fuel tank 12 is, the larger the space in which the fuel vapor exists is. Accordingly, an amount of the fuel vapor existing within the fuel tank 12 is large, and the total amount of the fuel vapor introduced into the canister 14 at the time of executing the large amount of leak determination is increased. As a result, the pressure of the fuel vapor path 24 is largely lowered by the condensation.

Accordingly, as shown in FIG. 11, in order to avoid the erroneous determination whether or not the leak abnormality is generated, in the case that the start time concentration is high or the remaining amount of the fuel within the fuel tank 12 is small, it is desirable to set the low pressure as the instantaneous determination pressure Pb.

On the other hand, as shown in FIG. 12, in the case that the start time concentration mentioned above is low or the remaining amount of the fuel within the fuel tank 12 is large, it is possible to precisely determine whether or not the leak abnormality is generated, even by setting the comparatively high pressure as the instantaneous determination pressure Pb.

The higher the instantaneous determination pressure Pb is set at this time, the earlier the actually measured pressure P reaches the instantaneous determination pressure Pb. It is thus possible to achieve an early finish of the large amount of leak determination. Further, it is possible to shorten the driving time of the pump 38 so as to achieve an extension of a service life, by early finishing the large amount of leak determination. Further, the air discharged to the outside of the fuel vapor path 24 during the execution of the large amount of leak determination is purified by the canister 14, however, containing a very small amount of fuel vapor. Accordingly, it is possible to reduce an amount of the fuel vapor discharged to the outside from the fuel vapor path 24, by early finishing the large amount of leak determination. For the reason mentioned above, it is desirable to set the high pressure as the instantaneous determination pressure Pb, at a time when the start time concentration is low or the remaining amount of the fuel within the fuel tank 12 is small.

Further, the higher the temperature of the fuel within the fuel tank 12 is, the higher the saturation vapor pressure of the fuel is. Accordingly, the start time concentration is high.

On the basis of the actual condition mentioned above, in the present embodiment, the higher the temperature of the fuel within the fuel tank 12 is, or the smaller the remaining amount of the fuel within the fuel tank 12 is, the lower the instantaneous determination pressure Pb is set.

Accordingly, in the case that the start time concentration is high or the remaining amount of the fuel within the fuel tank 12 is small, in other words, in the case that the degree of decrease of the pressure of the fuel vapor path 24 caused by the condensation of the fuel is large (refer to FIG. 11), the instantaneous determination pressure Pb is set to a low pressure, and the erroneous determination whether or not the leak abnormality is generated is properly suppressed.

Further, in the case that the start time concentration is low or the remaining amount of the fuel within the fuel tank 12 is large, in other words, the degree of decrease of the pressure of the fuel vapor path 24 caused by the condensation of the fuel is small (refer to FIG. 12), the comparatively higher pressure is set as the instantaneous determination pressure Pb, however, the erroneous determination mentioned above is properly suppressed. Further, since a period (period T1) from a time of starting the operation of the pump 38 in the actual measurement state to a time when the actually measured pressure P reaches the instantaneous determination value becomes shorter in comparison with a period (period T2) in the structure in which the instantaneous determination pressure A at a time when the decreasing degree of the pressure of the fuel vapor path 24 mentioned above is large is set as the instantaneous determination pressure Pb at this time, it is possible to achieve an early finish of the large amount of leak determination.

As mentioned above, in accordance with the present embodiment, it is possible to set the instantaneous determination pressure Pb in correspondence to the degree of decrease of the pressure of the fuel vapor path 24, and it is possible to precisely execute the determination of the leak abnormality at a time when the pressure of the fuel vapor path 24 is temporarily lowered. Further, in the case that the start time concentration is low or the remaining amount of the fuel within the fuel tank 12 is large, it is possible to achieve the early finish of the large amount of leak determination.

As described above, in accordance with the present embodiment, it is possible to obtain the advantages described below.

(1) It is possible to determine whether or not the leak abnormality is generated, by using the suitable determination pressure (the stabilization determination pressure Pa or the instantaneous determination pressure Pb) in each of the case that the pressure of the fuel vapor path 24 is temporarily lowered due to the condensation of the fuel within the canister 14, and the case that the pressure is stabilized. Accordingly, it is possible to precisely determine whether or not the leak abnormality is generated in the apparatus in which the temporary decrease of the pressure of the fuel vapor path 24 is caused.

(2) The higher the temperature of the fuel within the fuel tank 12 is, or the smaller the remaining amount of the fuel within the fuel tank 12 is, the lower pressure is set as the instantaneous determination pressure Pb. Accordingly, it is possible to set the instantaneous determination pressure Pb in correspondence to the degree of decrease of the pressure of the fuel vapor path 24 caused by the condensation of the fuel, and it is possible to precisely execute the determination of the leak abnormality at a time when the pressure of the fuel vapor path 24 is temporarily lowered.

The embodiment mentioned above may be modified as follows.

The structure may be made such as to detect a temperature having a high correlation with the temperature of the fuel within the fuel tank 12 such as a temperature of an atmospheric air, a temperature of a lubricating oil or the like, and use this temperature as an index value of the temperature of the fuel for setting the instantaneous determination pressure Pb.

The structure may be made such as to set the instantaneous determination pressure Pb on the basis of any one of the temperature of the fuel within the fuel tank 12 and the remaining amount of the fuel.

The structure may be made such as to set a fixed pressure as the instantaneous determination pressure Pb without depending on the temperature of the fuel within the fuel tank 12 and the remaining amount of the fuel.

The structure may be made such as to detect or calculate a concentration of the fuel vapor within the fuel tank 12 in place of the temperature of the fuel within the fuel tank 12 so as to use the concentration as a parameter for setting the instantaneous determination pressure Pb.

The structure may be made such as to set a lower instantaneous determination pressure than the reference pressure PLv in the case that there is a fear that the erroneous determination is generated due to a temporary decrease of the pressure of the fuel vapor path 24 mentioned above, in the small amount leak determination, and determine that the leak abnormality is not generated in the case that any one of the following conditions III and IV is satisfied, and determine that the leak abnormality is generated in the case that neither the conditions III nor IV are not satisfied.

Condition III: the actually measured pressure P is equal to or less than the instantaneous determination pressure.

Condition IV: the actually measured pressure P at a stabilized state after being changed by the operation of the pump 38 is equal to or less than the reference pressure PLv.

In this case, it is preferable to set the instantaneous determination pressure to such a pressure that the actual measured pressure P does not reach even in the case that the pressure of the fuel vapor path 24 is temporarily lowered as mentioned above in the condition that the small amount of leak is generated in the fuel vapor path 24. In this case, in the structure mentioned above, the instantaneous determination pressure functions as the first determination pressure, and the reference pressure PLv functions as the second determination pressure.

The abnormality determining apparatus in accordance with the above illustrated embodiment may use a constant pressure as the second determination pressure. Alternatively, the second determination pressure may be variable based on the temperature of the fuel within the fuel tank 12 and the remaining amount of the fuel, In other words, the abnormality determining apparatus of the illustrated embodiment may be modified in such a manner that a reference pressure (the reference pressure PLv in the embodiment mentioned above) for determining the leak abnormality of the fuel vapor path 24 is not set, and a determination pressure is not set on the basis of such a reference pressure.

A description will be given below of a second embodiment obtained by embodying the abnormality determining apparatus of the fuel vapor processing system in accordance with the present invention, while mainly focusing on different points from the first embodiment.

The abnormality determining apparatus in accordance with the present embodiment is different from the abnormality determining apparatus in accordance with the first embodiment in processing contents of the large amount of leak determination process.

A description will be given below of an outline of the large amount of leak determination process in accordance with the present embodiment.

In the large amount of leak determination process in accordance with the present embodiment, it is basically determined whether or not the leak abnormality of the fuel vapor path 24 is generated as follows. In other words, it is determined that the leak abnormality is not generated in the case that the actually measured pressure P at a stabilized state becomes equal to or less than the stabilization determination pressure Pa, and it is determined that the leak abnormality is generated in the case that the actually measured pressure P is stabilized without falling to or below the stabilization determination pressure Pa.

As mentioned above, in the case that the determination of the leak abnormality mentioned above is executed under the condition that the pressure of the fuel vapor path 24 is unlikely to be lowered due to a large amount of leak in the fuel vapor path 24, there is a case that the pressure of the fuel vapor path 24 becomes lower due to the condensation of the fuel within the canister 14 only temporarily.

Figure 13:
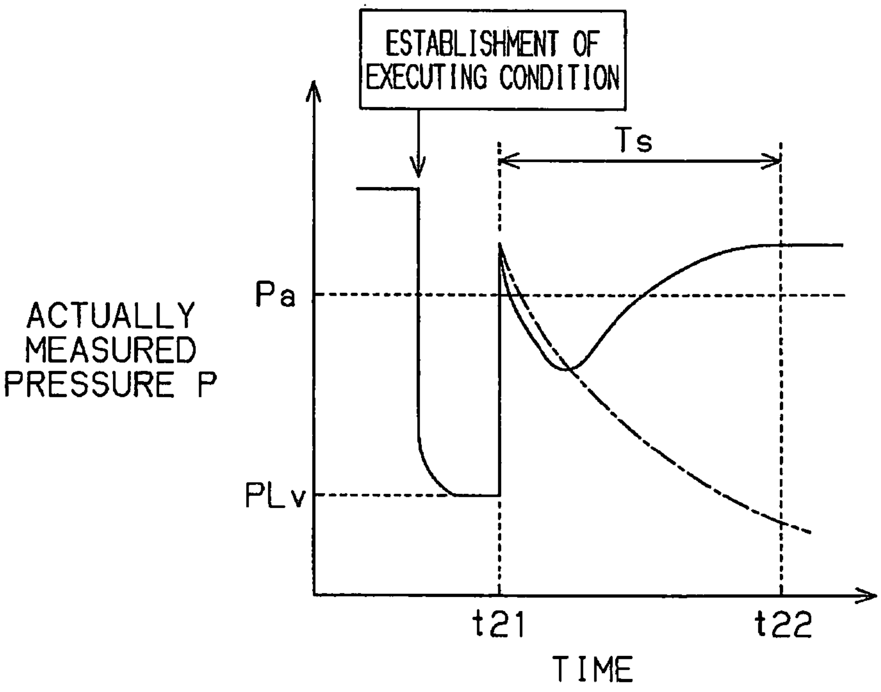
FIG. 13 is a timing chart showing one example of changes of the actually measured pressure in the case that the temporary decrease of the pressure of the fuel vapor path is generated.

FIG. 13, in the apparatus in accordance with the present embodiment, shows one example of a changes of the actually measured pressure P in the case that the temporary decrease of the pressure of the fuel vapor path 24 mentioned above is generated, at a time when the large amount of leak determination is executed under the condition that the large amount of leak is generated in the fuel vapor path 24. As shown by a solid line in FIG. 13, there is a case that the actually measured pressure P becomes equal to or less than the stabilization determination pressure Pa in the case that the temporary decrease of the pressure of the fuel vapor path 24 mentioned above is generated, and it is erroneously determined that the leak abnormality is not generated in the fuel vapor path 24 at this time.

On the basis of this point, in the abnormality determining apparatus in accordance with the present embodiment, in order to avoid the erroneous determination mentioned above, the structure is made such as to inhibit the execution of the determination of the leak abnormality mentioned above, over a predetermined period (times t21 to t22) after the operation of the pump 38 in the actual measurement state is started. In this case, in the abnormality determining apparatus in accordance with the present embodiment, the instantaneous determination pressure Pb is not set, and the determination of the leak abnormality is not executed on the basis of the comparison between the instantaneous determination pressure Pb and the actually measured pressure P.

A description will be in detail given below of the large amount of leak determination process mentioned above with reference to a flowchart shown in FIG. 14.

A series of processes shown in this flowchart conceptually show the specific processing procedure of the large amount of leak determining process, and the actual process is executed as the process per a predetermined cycle by the electronic controller 50. In the present embodiment, the electronic controller 50 functions as a determining section and an inhibiting section.

Figure 14:
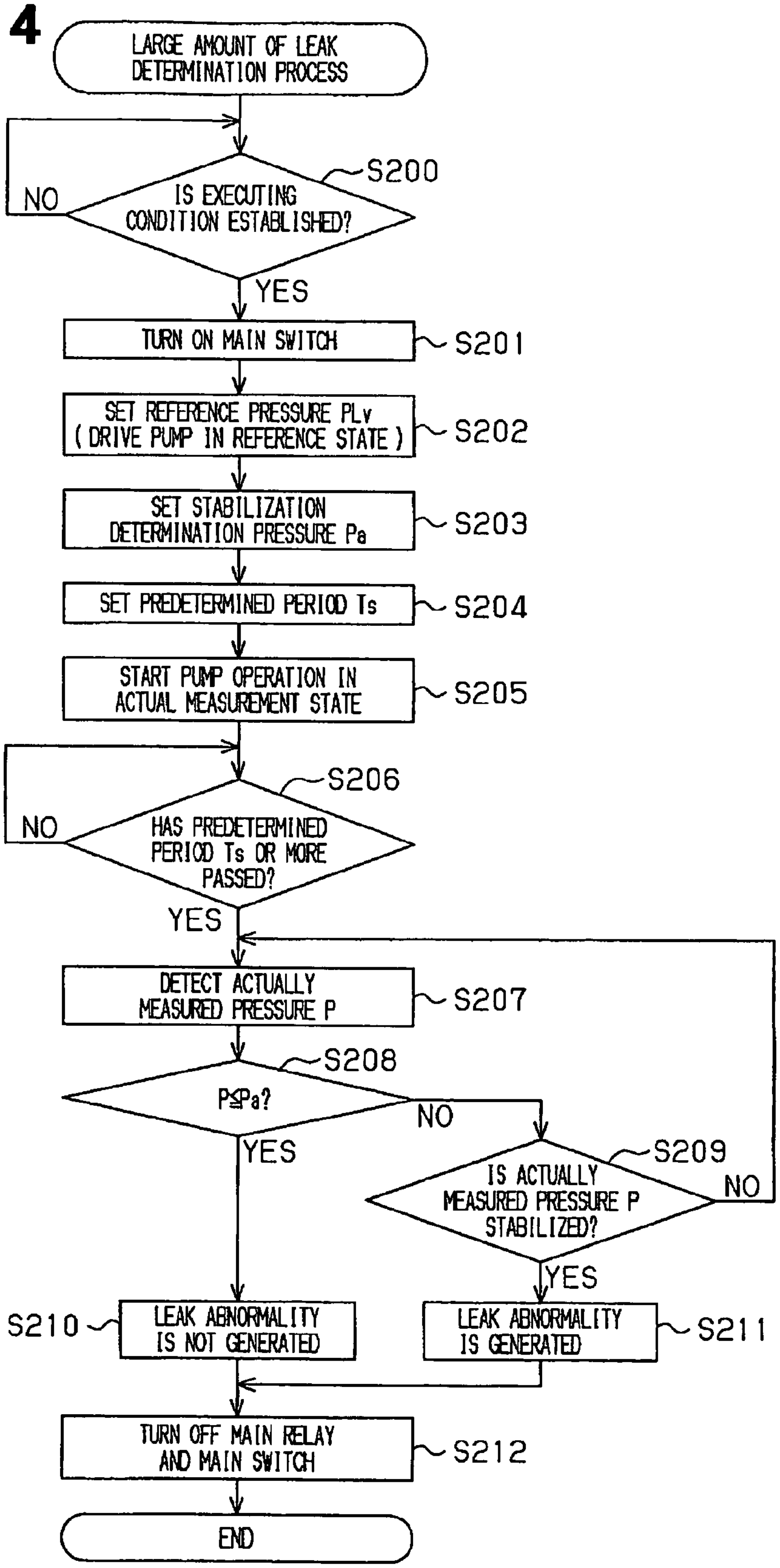
FIG. 14 is a flowchart showing a specific processing procedure of a large amount leak determination process in accordance with a second embodiment of the present invention.

As shown in FIG. 14, in this process, first, it is determined whether or not the executing condition of the large amount of leak determining process is established (a step S200). When the operation stop state of the internal combustion engine 18 is continued over a predetermined period or more, it is determined that the executing condition is established. Further, if the executing condition is established (YES in the step S200), the main switch is at the ON position, and an electric power supply for driving the switch valve 36 and the pump 38 is started (a step S201).

Next, as mentioned above, the reference pressure PLv is set (a step S202), and the stabilization determination pressure Pa is set on the basis of the reference pressure PLv (a step S203). The stabilization determination pressure Pa is set to a pressure at which the actually measured pressure P reaches the stabilization determination pressure Pa in the case that the leak is not generated in the fuel vapor path 24 or some amount of leak is generated in the fuel vapor path 24, and the actually measured pressure at a time when the pressure of the fuel vapor path 24 is stabilized becomes higher than the stabilization determination pressure Pa in the case that a large amount of leak is generated in the fuel vapor path 24. Specifically, the higher the reference pressure PLv is, the higher pressure is set as the stabilization determination pressure Pa (refer to FIG. 8).

Next, the predetermined period (specifically, a predetermined period Ts) inhibiting the execution of the determination of the leak abnormality is set on the basis of the temperature of the fuel within the fuel tank 12 and the remaining amount of the fuel (a step S204 in FIG. 14).

Figure 15:
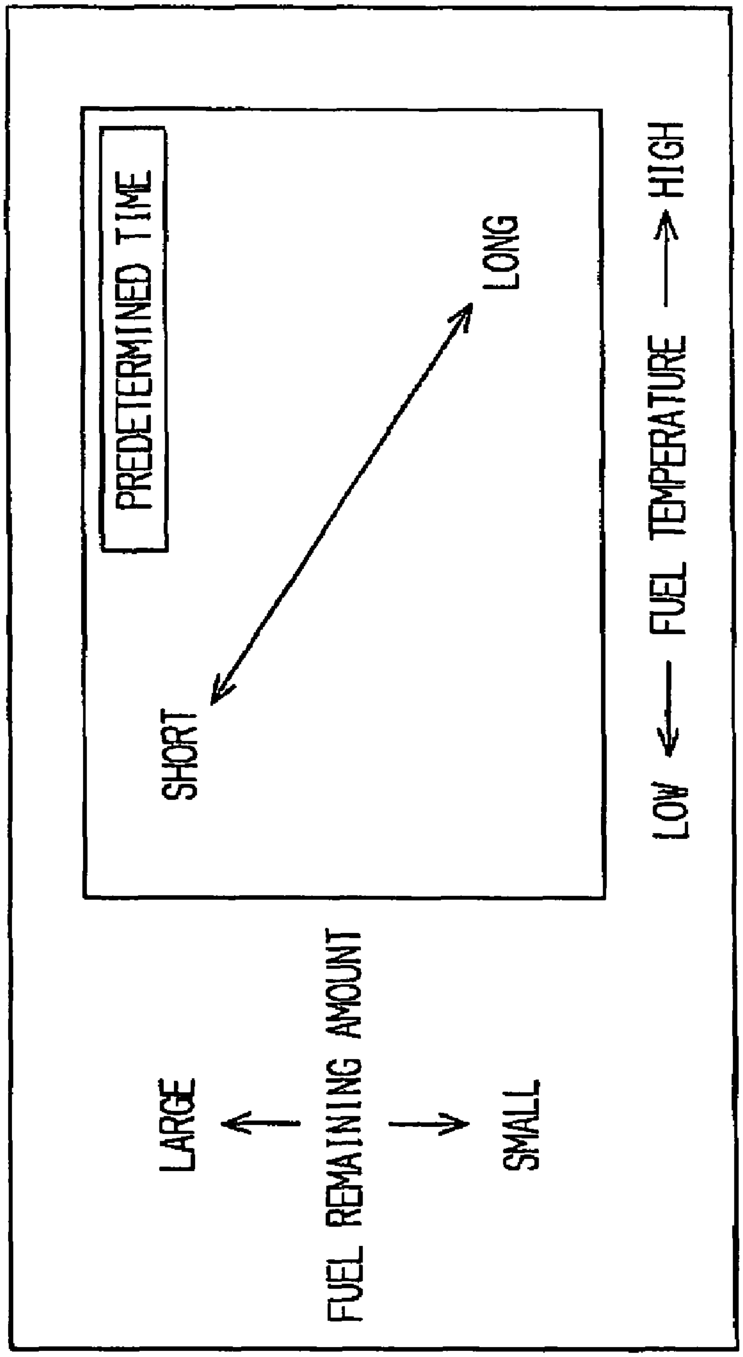
FIG. 15 is a view showing a relationship among a temperature of a fuel within the fuel tank, a remaining amount of the fuel, and a predetermined time.

FIG. 15 shows a relationship among the temperature of the fuel within the fuel tank 12, the remaining amount of the fuel and the predetermined period Ts mentioned above. As shown in FIG. 15, in this case, the higher the fuel temperature, and the smaller the remaining amount of the fuel, the longer the predetermined period Ts is set.

Next, the operation of the pump 38 in the actual measurement state is started (a step S205 in FIG. 14), the operation of the pump 38 is continued until the predetermined period Ts has passed thereafter, without executing the determination of the leak abnormality (NO in a step S206).

If the present process is continuously executed thereafter, and the predetermined period Ts has passed (YES in the step S206), the actually measured pressure P is detected (a step S207), and it is determined whether or not the actually measured pressure P is equal to or less than the stabilization determination pressure Pa (a step S208). Further, in the case that the actually measured pressure P is higher than the stabilization determination pressure Pa (NO in the step S208), it is determined whether or not the actually measured pressure P is stabilized (a step S209). In this case, the stabilization of the change of the actually measured pressure P is determined on the basis of the fact that a condition that an amount of change of the actually measured pressure P per unit time is very small is continued for a predetermined period. Further, in the case that the actually measured pressure P is not stabilized (NO in the step S209), the processes in the steps S207 to S209 are repeatedly executed until the actually measured pressure P becomes equal to or less than the stabilization determination pressure Pa or until the actually measured pressure P is stabilized.

In the case that the actually measured pressure P becomes equal to or less than the stabilization determination pressure Pa (YES in the step S208), it is determined that the leak abnormality is not generated (a step S210). In this case, in the present process, the determination result "the leak abnormality is not generated" does not correspond to the determination result indicating that no leak of the fuel vapor from the fuel vapor path 24 is generated at all, but corresponds to the determination result indicating that the leak is not generated at such a degree that it is necessary to determine that the large amount of leak is generated in the fuel vapor path 24.

On the other hand, in the case that the actually measured pressure P does not become equal to or less than the stabilization determination pressure Pa (NO in the step S208), and the actually measured pressure P is stabilized (YES in the step S209), it is determined that the leak abnormality is generated (a step S211).

After the determination whether or not the leak abnormality is generated as mentioned above (the step S210 or the step S211), the electric power supply to the switch valve 36, the pump 38, the pressure sensor 52 and the electronic controller 50 is stopped on the basis of the OFF position of the main relay and the main switch (a step S212), and the present process is finished.

A description will be given below of effects caused by executing the large amount of leak determining process mentioned above.

In the present embodiment, as shown in FIG. 13, the execution of the determination of the leak abnormality on the basis of the comparison between the actually measured pressure P and the stabilization determination pressure Pa is inhibited until the predetermined period Ts has passed after the operation of the pump 38 in the actual measurement state is started (the times t21 to t22).

Accordingly, in the case that the large amount of leak determination process is executed in the condition that the large amount of fuel vapor exists within the fuel tank 12 and the large amount of leak is generated in the fuel vapor path 24, the execution of the determination of the leak abnormality is inhibited in the period when there is a risk that the pressure of the fuel vapor path 24 is temporarily lowered due to the condensation of the fuel within the canister 14 as mentioned above.

Accordingly, in this case, as one example is shown by a solid line in FIG. 13, the determination mentioned above is not executed under the condition that the actually measured pressure P becomes equal to or less than the stabilization determination pressure Pa due to the temporary decrease of the pressure of the fuel vapor path 24 mentioned above, and it is possible to avoid erroneous determination that the leak abnormality is not generated.

Further, it is possible to determine that the leak abnormality is generated, on the basis of the fact that the actually measured pressure P is higher than the stabilization determination pressure Pa after the predetermined period Ts has passed (the time t22), in other words, after the temporary decrease of the pressure of the fuel vapor path 24 mentioned above is cancelled.

On the other hand, in the case that the leak abnormality is not generated in the fuel vapor path 24, it is possible to determine that the leak abnormality is not generated, on the basis of the fact that the actually measured pressure P is lower than the stabilization determination pressure Pa after the temporary decrease of the pressure of the fuel vapor path 24 mentioned above is cancelled (the time t22), as one example is shown by a one-dot chain line in FIG. 13.

As mentioned above, in accordance with the large amount of leak determination on the basis of the present embodiment, it is possible to avoid erroneous determination that the leak abnormality is not generated on the basis of the pressure of the fuel vapor path 24 which is temporarily lowered due to the condensation of the fuel within the canister 14. Accordingly, it is possible to precisely determine whether or not the leak abnormality is generated in the apparatus in which the temporary decrease of the pressure of the fuel vapor path 24 is caused.

Figure 16:
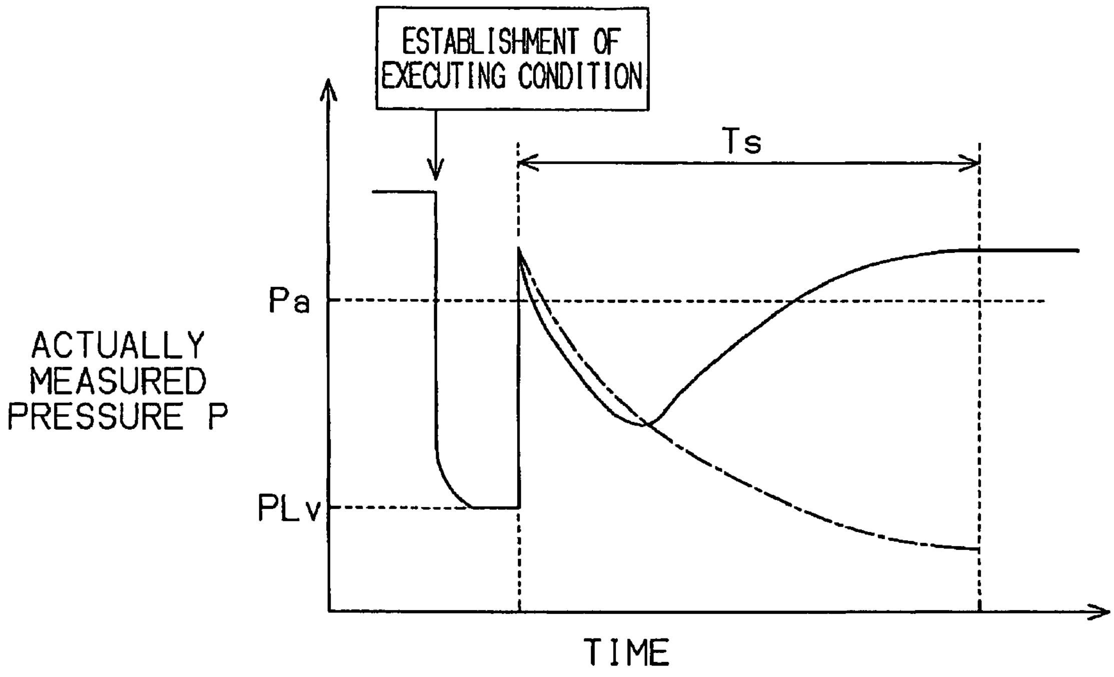
FIG. 16 is a timing chart showing one example of a relationship between a manner for setting a predetermined time and changes of an actually measured pressure in the large amount leak determination in accordance with the second embodiment.
Figure 17:
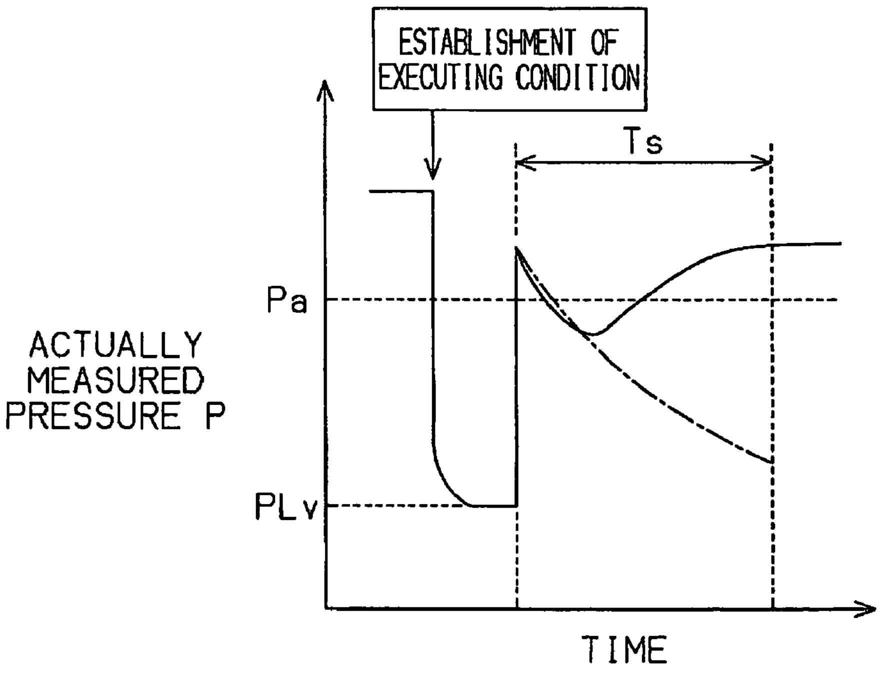
FIG. 17 is a timing chart showing another example of the relationship between a manner for setting the predetermined time and the changes of the actually measured pressure in the large amount leak determination.

FIGS. 16 and 17 show a relationship between a set mode of the predetermined period Ts and the changes of the actually measured pressure P in the large amount of leak determination.

In this case, FIG. 16 shows one example of the relationship mentioned above in the case that a concentration of the fuel vapor within the fuel tank 12 is high or the remaining amount of the fuel within the fuel tank 12 is small at the time of starting the operation of the pump 38 in the actual measurement state, and FIG. 17 shows one example of the relationship mentioned above in the case that the concentration of the fuel vapor mentioned above is low or the remaining amount of the fuel is large.

As shown in FIGS. 16 and 17, the higher the concentration of the fuel vapor within the fuel tank 12 at the time of starting the operation of the pump 38 in the actual measurement state (a start time concentration) is, the larger amount of the fuel vapor is introduced into the canister 14 at the time of executing the large amount of leak determination, and the phenomenon that the fuel is condensed within the canister 14 lasts long. Accordingly, the period that the pressure of the fuel vapor path 24 is temporarily lowered due to the generation of the phenomenon is long. Further, the smaller the remaining amount of the fuel within the fuel tank 12 is, the larger the space in which the fuel vapor exists is. Accordingly, the amount of the fuel vapor existing within the fuel tank 12 is large. Further, the larger the amount of the fuel vapor existing within the fuel tank 12 is, the larger amount of fuel vapor is introduced into the canister 14 at the time of executing the large amount of leak determination, and the phenomenon that the fuel is condensed within the canister 14 lasts long. Accordingly, the period that the pressure of the fuel vapor path 24 is temporarily lowered due to the generation of the phenomenon is long.

Accordingly, as shown in FIG. 16, in order to avoid erroneous determination whether or not the leak abnormality is generated, in the case that the start time concentration is high or the remaining amount of the fuel within the fuel tank 12 is small, it is desirable to set a long period as the predetermined period Ts.

On the other hand, as shown in FIG. 17, in the case that the start time concentration mentioned above is low or the remaining amount of the fuel within the fuel tank 12 is large, it is possible to precisely determine whether or not the leak abnormality is generated, even by setting a comparatively short period as the predetermined period Ts.

In this case, the shorter the predetermined period Ts is set, the earlier the determination of the leak abnormality on the basis of the comparison between the actually measured pressure P and the stabilization determination pressure Pa is started. It is thus possible to achieve an early finish of the large amount of leak determination. Further, as mentioned above, it is possible to achieve an extension of a service life of the pump 38, by early finishing the large amount of leak determination. Further, it is possible to reduce the amount of the fuel vapor discharged to the outside from the fuel vapor path 24 during the execution of the large amount of leak determination. For the reason mentioned above, it is desirable to set a short period as the predetermined period Ts, at a time when the start time concentration is low or the remaining amount of the fuel within the fuel tank 12 is small.

Further, the higher the temperature of the fuel within the fuel tank 12 is, the higher the saturation vapor pressure of the fuel is. Accordingly, the start time concentration is high.

On the basis of the actual condition mentioned above, in the present embodiment, the higher the temperature of the fuel within the fuel tank 12 is, or the smaller the remaining amount of the fuel within the fuel tank 12 is, the longer the predetermined period Ts is set.

Accordingly, in the case that the start time concentration is high or the remaining amount of the fuel within the fuel tank 12 is small, in other words, in the case that the phenomenon that the pressure of the fuel vapor path 24 is temporarily lowered due to the condensation of the fuel within the canister 14 lasts long (refer to FIG. 16), a long period is set as the predetermined period Ts, and erroneous determination whether or not the leak abnormality is generated is properly suppressed.

Further, in the case that the start time concentration is low or the remaining amount of the fuel within the fuel tank 12 is large, in other words, the continuing period of the phenomenon mentioned above is comparatively short (refer to FIG. 17), a comparatively shorter period is set as the predetermined period Ts, however, erroneous determination mentioned above is properly suppressed. Further, it is possible to early start the determination of the leak abnormality on the basis of the comparison between the actually measured pressure P and the stabilization determination pressure Pa, in comparison with the case that the phenomenon mentioned above lasts long, and it is possible to achieve an early finish of the large amount of leak determination.

As described above, in accordance with the present embodiment, it is possible to obtain the advantages described below.

(1) It is possible to avoid erroneous determination that the leak abnormality is not generated on the basis of the pressure of the fuel vapor path 24 which is temporarily lowered due to the condensation of the fuel within the canister 14. Accordingly, it is possible to precisely determine whether or not the leak abnormality is generated in the apparatus in which the temporary decrease of the pressure of the fuel vapor path 24 is caused.

(2) The higher the temperature of the fuel within the fuel tank 12 is, or the smaller the remaining amount of the fuel within the fuel tank 12 is, the longer the predetermined period Ts is set. Accordingly, it is possible to set the predetermined period Ts in correspondence to the period in which the pressure of the fuel vapor path 24 is temporarily lowered due to the condensation of the fuel, and it is possible to properly suppress erroneous determination with respect to the leak abnormality. Further, if the continuing period of the phenomenon is short, it is possible to achieve an early finish of the large amount of leak determination.

The embodiments mentioned above may be modified as follows.

The structure may be made such as to detect a temperature having a high correlation with the temperature of the fuel within the fuel tank 12 such as a temperature of an atmospheric air, a temperature of a lubricating oil or the like, and use this temperature as an index value of the temperature of the fuel for setting the predetermined period Ts.

The structure may be made such as to set the predetermined period Ts on the basis of any one of the temperature of the fuel within the fuel tank 12 and the remaining amount of the fuel.

The structure may be made such as to set a fixed period as the predetermined period Ts without depending on the temperature of the fuel within the fuel tank 12 and the remaining amount of the fuel.

The structure may be made such as to detect or calculate a concentration of the fuel vapor within the fuel tank 12 in place of the temperature of the fuel within the fuel tank 12 so as to use the concentration as a parameter for setting the predetermined period Ts.

The structure may be made such as to set a predetermined period and inhibit the execution of the determination of the leak abnormality on the basis of the comparison between the reference pressure PLv and the actually measured pressure P until the predetermined period has passed after the operation of the pump 38 is started in the case that there is a fear that erroneous determination is generated due to the temporary decrease of the pressure of the fuel vapor path 24 mentioned above, in the small amount leak determination. In this case, in the structure, the reference pressure PLv functions as the predetermined determination pressure.

It is possible to apply the abnormality determining apparatus in accordance with the present embodiment to an abnormality determining apparatus in which a basic pressure (the reference pressure PLv in the embodiment mentioned above) for determining the leak abnormality of the fuel vapor path 24 is not set, and a determination pressure on the basis of the basic pressure is not set, such as an abnormality determining apparatus in which a fixed pressure is set as the predetermined determination pressure (the stabilization determination pressure Pa or the reference pressure PLv), or an abnormality determining apparatus in which the predetermined determination pressure is variably set on the basis of the temperature of the fuel within the fuel tank 12 and the remaining amount of the fuel, after appropriately modifying the structure.

The invention claimed is:

1. An abnormality determining apparatus of a fuel vapor processing system, wherein the system includes a canister for temporarily reserves fuel vapor generated within a fuel tank and a fuel vapor path for discharging the fuel vapor to an engine intake passage, the abnormality determining apparatus comprising:

a pump, wherein, when it is determined that there is a leak abnormality in the fuel vapor path, the pump is operated to discharge air from the fuel vapor path to the outside through the canister;

a detector that, when the pump is operated, detects a pressure in the fuel vapor path as an actually measured pressure; and a determining section that determines whether there is a leak abnormality, wherein the determining section sets a first determination pressure and a second determination pressure that is higher than the first determination pressure, and wherein the determining section determines that there is no leak abnormality either when a first condition is met or when a second condition is met, the first condition indicating that the actually measured pressure is less than or equal to the first determination pressure, and the second condition indicating that the actual measured pressure when changes due to the operation of the pump have subsided is less than or equal to the second determination pressure, and wherein the determining section determines that there is a leak abnormality when none of the first condition nor the second condition is met.

2. The abnormality determining apparatus according to claim 1, wherein, the higher the concentration of the fuel vapor within the fuel tank at the time of starting of the operation of the pump, the lower the first determination value the determination portion sets.

3. The abnormality determining apparatus according to claim 1, wherein, the higher the temperature of the fuel within the fuel tank, the lower the first determination value the determination portion sets.

4. The abnormality determining apparatus according to claim 1, wherein, the smaller the amount of the remaining fuel within the fuel tank, the lower the first determination pressure the determination portion sets.

5. An abnormality determining apparatus of a fuel vapor processing system, wherein the system includes a canister for temporarily reserves fuel vapor generated within a fuel tank and a fuel vapor path for discharging the fuel vapor to an engine intake passage, the abnormality determining apparatus comprising:

a pump, wherein, when it is determined that there is a leak abnormality in the fuel vapor path, the pump is operated to discharge air from the fuel vapor path to the outside through the canister;

a detector that, when the pump is operated, detects a pressure in the fuel vapor path as an actually measured pressure;

a determining section that determines whether there is a leak abnormality, wherein the determining section determines that there is no leak abnormality when the measured pressure falls to or below a predetermined pressure; and an inhibiting section that inhibits the execution of the leak abnormality determination for a predetermined period after the operation of the pump is started.

6. The abnormality determining apparatus according to claim 5, wherein, the higher the concentration of the fuel vapor within the fuel tank at the time of starting of the operation of the pump, the longer the predetermined period the inhibiting section sets.

7. The abnormality determining apparatus according to claim 5, wherein, the higher the temperature of the fuel within the fuel tank, the longer the predetermined period the inhibiting section sets.

8. The abnormality determining apparatus according to claim 5, wherein, the smaller the amount of the remaining fuel within the fuel tank, the longer the predetermined period the inhibiting section sets.

* * * * *